US012773634B2

(12) United States Patent
Barn et al.

(10) Patent No.: US 12,773,634 B2
(45) Date of Patent: Oct. 27, 2026

(54) METHOD OF GENERATING A SOUND EFFECT FOR A VIDEO GAME

(71) Applicant: Sony Interactive Entertainment Europe Limited, London (GB)

(72) Inventors: Lewis Barn, London (GB); Christopher Buchanan, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 203 days.

(21) Appl. No.: 18/670,060

(22) Filed: May 21, 2024

(65) Prior Publication Data

US 2024/0390793 A1 Nov. 28, 2024

(30) Foreign Application Priority Data

May 24, 2023 (GB) ..................................... 2307782

(51) Int. Cl.
*A63F 13/54* (2014.01)
*A63F 13/55* (2014.01)

(52) U.S. Cl.
CPC .............. *A63F 13/54* (2014.09); *A63F 13/55* (2014.09)

(58) Field of Classification Search
CPC .......... A63F 13/22; A63F 13/25; A63F 13/50; A63F 13/54; A63F 13/55; A63F 13/57; A63F 13/577; A63F 13/60; A63F 2300/30; A63F 2300/6063; A63F 2300/6081; A63F 2300/807
See application file for complete search history.

(56) References Cited

U.S. PATENT DOCUMENTS 12,190,013 B2 * 1/2025 Ashby ..................... A63F 13/60
2003/0045956 A1 * 3/2003 Comair .................. A63F 13/45 381/61
2005/0182608 A1 * 8/2005 Jahnke .................. A63F 13/54 703/6
2022/0012007 A1 * 1/2022 Ashby ..................... A63F 13/54
(Continued)

FOREIGN PATENT DOCUMENTS

CN 113332723 A 9/2021
EP 1151776 A2 11/2001
(Continued)

OTHER PUBLICATIONS

O'Brien, J.F. et A.,"Synthesizing Sounds from Rigid-Body Simulations", EECS, Computer Science Division University of California, Berkeley, Jul. 2002, pp. 175-203.
(Continued)

*Primary Examiner* — Omkar A Deodhar
(74) *Attorney, Agent, or Firm* — Fish & Richardson P.C.

(57) ABSTRACT

A computer-implemented method of generating a sound effect for a video game. The method comprises: receiving a first sound effect file comprising one or more sound effect features; receiving a first animation representing an action in the video game; determining, based on the received animation, one or more constraints to be applied to the or each sound effect features; adjusting the or each sound effect feature so as to produce corresponding adjusted sound effect features satisfying the determined constraints; and generating a second sound effect file comprising the adjusted sound effect features.

20 Claims, 2 Drawing Sheets

(56) References Cited

U.S. PATENT DOCUMENTS

| | | | | |
|---|---|---|---|---|
| 2023/0020621 | A1* | 1/2023 | Rios | G10L 25/30 |
| 2023/0390642 | A1* | 12/2023 | Villanueva Aylagas | G06N 3/0475 |

FOREIGN PATENT DOCUMENTS

| | | | |
|---|---|---|---|
| JP | 2005218706 | A | 8/2005 |
| JP | 2014063182 | A | 4/2014 |
| JP | 2018129096 | A | 8/2018 |

OTHER PUBLICATIONS

Combined Search and Examination Report under Sections 17 and 18(3) of Patents Act 1977 for Application No. GB2307782.9 dated Oct. 25, 2023, 7 pages.

* cited by examiner

METHOD OF GENERATING A SOUND EFFECT FOR A VIDEO GAME

CROSS-REFERENCE TO RELATED APPLICATION

The present application claims priority from United Kingdom Patent Application No. GB2307782.9, filed May 24, 2023, the disclosure of which is hereby incorporated herein by reference.

FIELD OF THE INVENTION

This invention relates to computer-implemented methods of generating sound effects for video games.

BACKGROUND

In video game development, there is often a need to produce sound effects associated with the large number of objects that will appear in the video game. For example, there might be large number of weapons available for the player to use during gameplay. A weapon such as a sword might require one sound effect representing the sword being swung, another to be played when the sword hits a wooden surface, yet another for hitting stone, and so on. Each of these interactions will also be associated with a different animation (e.g. one animation representing the swinging of the sword and another representing the sword striking a solid object). Often, there will be many objects belonging to the same category (e.g. several different swords) each requiring a unique set of animations and sound effects representing the different interactions that can be performed with that object. However, there will generally be some similarity between the sound effects and animations that are developed for objects belonging to the same category: returning again to the swords example, it would be expected that an iron sword and a steel sword would sound similar to one another when striking the same enemy or object. One conventional approach to generating sound effects for a set of objects belonging to the same category has been to start with one basic set of sound effects and produce unique sounds for the various objects by modifying this basic set. For example, starting with a sound effect representing an iron sword striking stone, a convincing sound effect for a steel sword undergoing the same interaction could be produced by small adjustment of the initial sound effect. However, this approach is in practice very time consuming, requiring the developer to manually generate a modified sound for each object, and involves a large amount of trial and error since the modifications applied will not always produce a convincing result. There is therefore a need for a faster way of developing sound effects for objects in video games.

SUMMARY

The invention provides a computer-implemented method of generating a sound effect for a video game, the method comprising:

- receiving a first sound effect file comprising one or more sound effect features;
- receiving a first animation representing an action in the video game;
- determining, based on the received animation, one or more constraints to be applied to the or each sound effect features;
- adjusting the or each sound effect feature so as to produce corresponding adjusted sound effect features satisfying the determined constraints; and
- generating a second sound effect file comprising the adjusted sound effect features.

In this method, a bespoke second sound effect is generated for the first animation by modifying the first sound effect file (which could be, for example, a stock sound effect not associated with any specific object in the video game) based on constraints derived from the first animation. As noted above, the first sound effect file comprises one or more sound effect features. The sound effect features represent elements of the sound effect and typically will be layers of the sound effect file. An example of a suitable file format for the first sound effect file is the Wave (.wav) format. This speeds up the development of sounds effects to be associated with animations during the development of the video game since it overcomes the need for the sound designer to create new sound effects manually.

Based on the received first animation, constraints to be applied to the sound effect feature(s) are determined. The constraints define the characteristics that the adjusted sound effect features may have and are chosen so as to make the resulting sound effect features suitable for association with the first animation. One simply example of a constraint that could be determined based on the first animation is the duration of the sound effect feature(s): for example, a constraint could be applied whereby the duration of the sound effect feature(s) may be no greater than the duration of the first animation. In another example, if it were determined that an object represented in the animation is made of steel, the constraints could be chosen such that the adjusted sound effect features give the impression of the sound of steel (e.g. a suitable pitch range and range of possible durations). The animation may be received in the form of an animation file-for example a .anim file. This animation file would typically be produced using a graphics design tool as part of the process of developing the video game. The animation file may contain data defining the visual content of the animation, e.g. a sequence of frames.

As noted above, the sound effect feature(s) may advantageously be layers of the sound effect file. Each layer could represent a basic sound, and several layers can be combined in the sound effect files to create rich, complex sounds. For example, in a sound effect representing a weapon striking an enemy, one layer could provide the basic sound of the impact and another layer could provide a bass sound coinciding with the impact to provide depth to the sound effect.

It will be appreciated that different constraints may be determined for each sound effect feature. For example, for a sound effect feature (e.g. a layer) representing the basic sound of an impact as just described, a constraint could be placed on the pitch of this layer based on a material identified in the animation. For the bass layer, the pitch may be unchanged but the duration or volume could be altered to vary the impression of depth created by this layer.

In preferred embodiments, adjusting the sound effect features comprises, for each sound effect feature (e.g. each layer), varying one or more sound parameters of the sound effect feature, wherein the one or more sound parameters preferably comprise one or more of:

- a pitch of the sound effect feature;
- a temporal position of the sound effect feature;
- a relative temporal separation between the sound effect feature and another one of the sound effect features;
- a duration of the sound effect feature; and
- a volume of the sound effect feature.

By "sound effect parameter" we may any property of the sound effect feature (e.g. a layer) that can be varied. Such properties include the examples listed above. By "temporal position" we mean the span of time over which the sound effect feature is played in the sound effect. The time at which the sound effect feature is played could be delayed by moving the sound effect feature to a later temporal position, for example. The "temporal separation" is the relative separation in time between two sound effect features—e.g. in the case of a steel sword striking an object, the sound effect could include a sound effect feature representing the sound of the impact and then, at a slightly later point in time, the sound of the steel blade ringing.

Adjusting the sound effect features may comprise randomising the one or more sound parameters of each sound effect feature.

In some preferred embodiments, the randomisation of the sound parameters is performed a plurality of times so as to generate a plurality of versions of each sound parameter; and wherein producing the adjusted sound effect feature satisfying the determined constraints comprises selecting, from the plurality of generated versions of each sound parameter, one version of each sound parameter that satisfies the determined constraints. In other words, the sound parameters of each sound effect parameter are randomised multiple times, resulting in several versions of the first sound effect (each version of the first sound effect being constituted by a respective set of the generated versions of the sounds parameters), and the version that meets the determined constraints is selected.

In other preferred embodiments, the randomisation is controlled such that each randomised sound effect parameter falls within the determined constraints. In other words, sound parameters will be randomised within the bounds of the constraints—e.g. if one of the constraints is a pitch range, the pitch of the sound effect feature to which this constraint is applied may be adjusted to a random value within that range.

As noted above, the determined constraints are preferably limits on the one or more sound parameters of the sound effect feature. For example, each constraint could comprise an upper limit, a lower limit, an allowed range, or a specified value for the respective sound parameter of the sound effect feature.

Preferably the determining, based on the received animation, one or more constraints to be applied to the sound effect features, is based on animation parameters of the animation, the one or more animation parameters preferably comprising one or more of:

- a duration of the animation;
- one or more dimensions of an object in the animation;
- a shape of an object in the animation;
- a material of an object in the animation; and
- a movement speed of an object in the animation.

The animation parameters may be determined based on the content of an animation file of the kind described above-for example based on the visual content of the animation (e.g. the frames of an animation file) or other data associated with the animation file, for example metadata describing features of objects in the animation (e.g. the material of the objects).

The animation parameters may advantageously be identified using a computer vision algorithm. Such techniques are particularly suitable for identifying properties such as shapes and materials and therefore provide a way of taking these variables into account for the generation of the second sound effect. Other visual analysis techniques (e.g. pattern recognition) could alternatively be used. A computer vision algorithm could be applied to an animation file of the kind described above.

The first animation is preferably received in the form of a file comprising data representing at least some of the animation parameters. Some of the parameters listed above, such as duration, can conveniently be identified in such a file: for example, the number of frames in the animation could be determined from the file, from which the duration of the animation could be inferred.

BRIEF DESCRIPTION OF DRAWINGS

Examples of methods in accordance with embodiments of the invention will now be described with reference to the accompanying drawings, in which.

DETAILED DESCRIPTION

Figure 1:
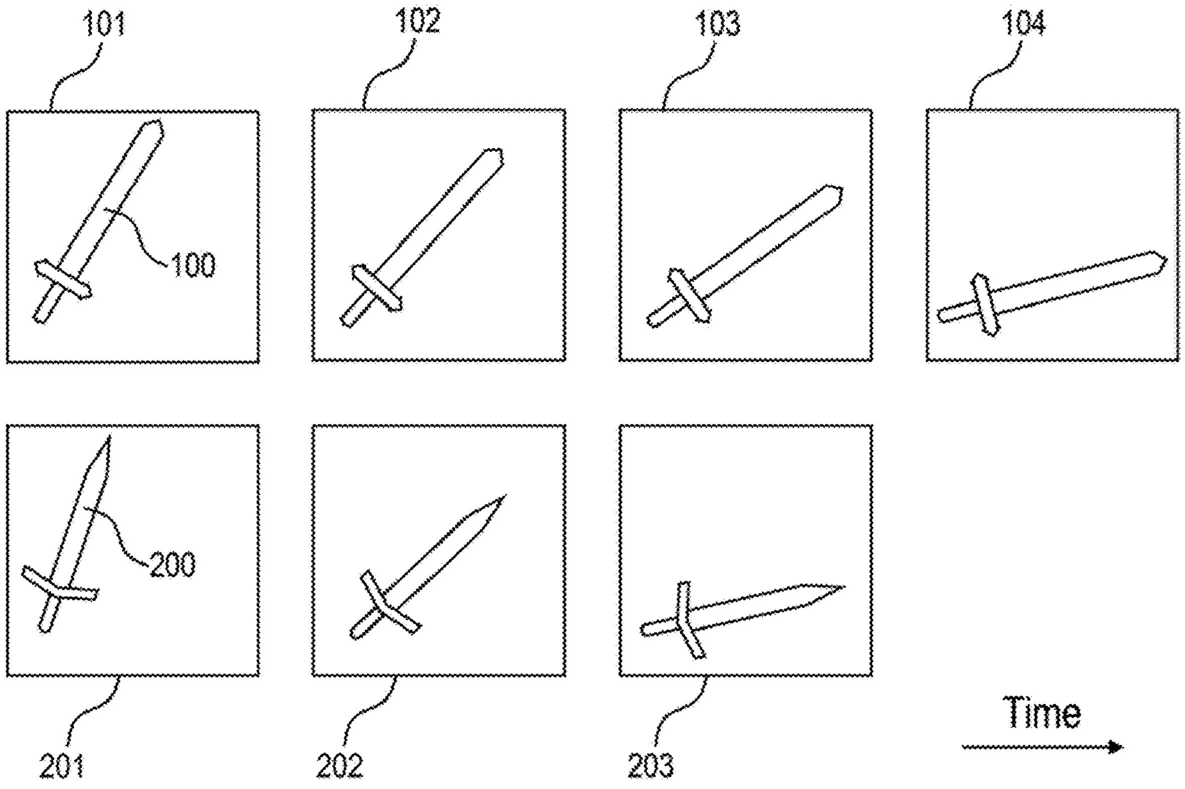
FIG. 1 shows frames of a first animation and a second animation in an example of a method in accordance with an embodiment of the invention.

FIG. 1 shows frames of animations for a video game in an example of a method in accordance with an embodiment of the invention. These animations represent the action of swords swinging in the video game. As indicated by the arrow labelled "Time", the frames of the animations are ordered in time from left to right.

The first animation is of a first sword 100 swinging. The first animation has four frames: frame 101 at a time T1, frame 102 at time T2, frame 103 at time T3, and frame 104 at time T4. The second animation is of a second sword 200 swinging and has three frames: frame 201 at time T1, frame 202 at time T2, and frame 203 at time T3. The first animation therefore has a temporal duration of 4 frames and the second animation has a temporal duration of 3 frames.

The second sword 200 is smaller than the first sword 100, so the swing of the second sword 200 is represented in the animation as being faster (and therefore having a shorter temporal duration) than that of the larger, slower first sword 100.

In development of the video game, the sound developer will need to produce sound effects for the two animations representing the sounds of the swords 100, 200 cutting through air. The two sound effects will be similar but, because the swords have different sizes, shapes, weights and other properties, not identical.

Figure 2:
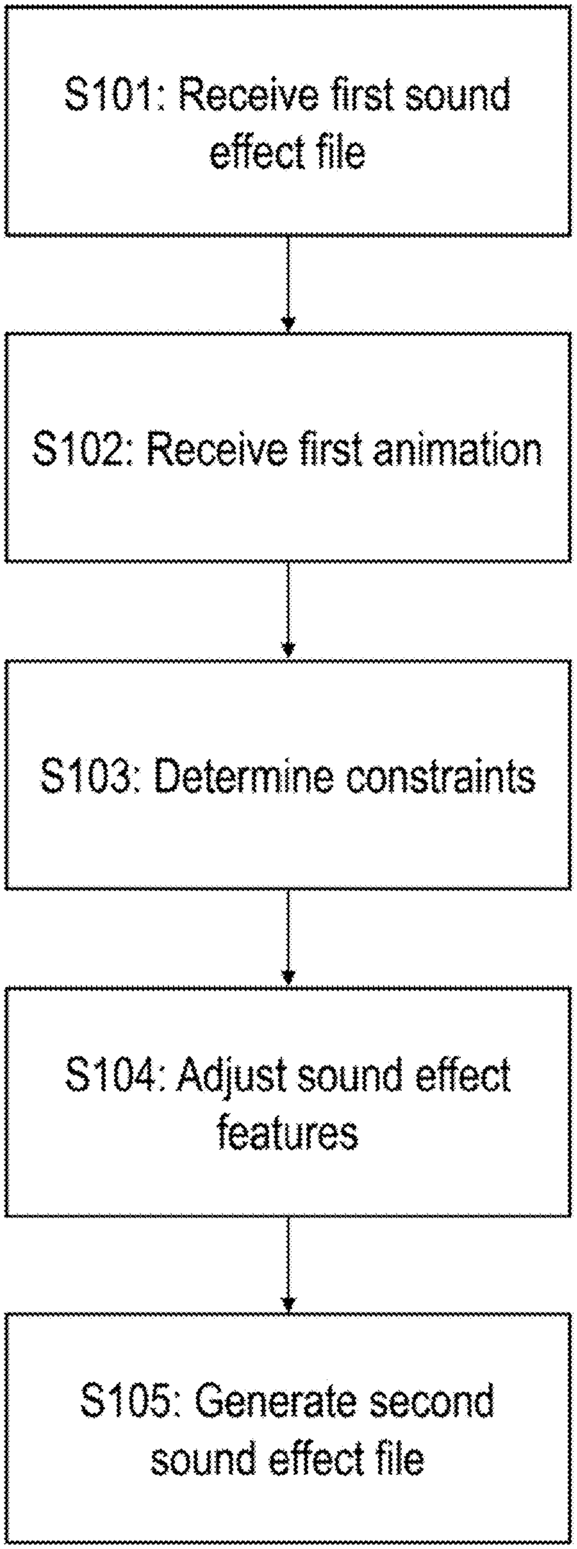
FIG. 2 is a flow chart showing steps of a method in accordance with an embodiment of the invention.

FIG. 2 is a flowchart representing an example of a method of generating sound effects in accordance with an embodiment of the invention, which can be used to generate sound effects to be associated with the two animations shown in FIG. 1. The method is performed by a computer.

In a first step S101, a first sound effect file is received. This sound effect file will typically be either (i) a stock sound effect file representing the general category of object for which a sound effect is being generated (e.g. a generic sound effect representing a sword swinging through air) or (ii) a sound effect that has been developed for an animation of one object in a category in which sounds effects for other similar objects now need to be developed. The sound effect file comprises a plurality of sound effect features. The sound effect features will typically be layers of the first sound effect file, since often the sound effect will be formed of a plurality of layers that may each represent a basic sound sample and which are combined in the sound effect file to create a complex, bespoke sound effect. The sound effect features are variable, by which it is meant mean that parameters of each sound effect feature (e.g. layer) may be varied: for example, the volume, pitch, duration, and temporal position can each be controlled. The sound effect file will typically be a .wav file.

In step S102, a first animation is received. The first animation is an animation for which a sound effect is to be generated. The animation could be received a variety of formats, one example of which is a set of image files representing the frames of the animation (as shown in FIG. 1). Alternatively the first animation could be received in the form of a file containing the animated 3D model, such as a .anim file, which is advantageous as properties such as the dimensions and material of the object may be identified by data contained in such a file.

In step S103, based on the received first animation, there are determined a set of constraints to be applied to the sound effect features. Typically the constraints will be numerical limits to be placed on the sound parameters of each sound effect feature in the first sound effect. For example, a constraint applied to one sound effect feature (e.g. layer) could be upper and/or lower limit on the volume of the sound effect feature, or a limitation to be applied to the pitch range of the sound effect feature.

As noted above, the constraints are determined based on the first animation. The principle here is that a set of constraints defining an appropriate adjustment of the first sound effect can be determined based on the first animation: one very simple example of this is identifying the duration of the animation (e.g. from the number of frames) and determining from this information a constraint specifying that the duration of the sound effect features should be the same as that of the animation. In another example, it could be determined from the first animation that an object in the first animation is made of a material such as steel, and that a sound effect representing an action such as the object striking a hard surface should have a pitch that is sufficiently high and a duration of sufficient length to convincingly imitate the 'ring' of the steel when struck. In the example shown in FIG. 1, it could be determined from the frames 101, 102, 103, 104 that the first animation includes an object, namely the sword 100, which has certain dimensions. The constraints could then be selected so that for the swinging action shown in the frames 101, 102, 103, 104, a relatively deep, slow rushing sound is generated corresponding to the relatively large size of the sword 100. By comparison, the constraints identified for the sword 200 would correspond to a faster, sharper rushing sound since the sword 200 is smaller and its swinging animation has a shorter temporal duration.

Determining the constraints could be performed based on visual processing of the first animation: for example by applying computer vision to the frames 101, 102, 103, 104 of the first animation to identify animation parameters such as material and shape of the object. If the animation is received in the form of a file containing an animated 3D model, the animation parameters could be derived from data in this file—for example, data in the file might specify the dimensions of the object and the texture in which it is to be rendered, from which its material could be inferred.

Once the constraints have been determined, the sound effect features of the first sound effect file are adjusted so as to produce a corresponding set of adjusted sound effect features satisfying the determined constraints. In the FIG. 1 example, this could involve raising or lowering the pitch of some or all of the sound effect features to fall within respective ranges determined as part of the set of constraints in step S103. Varying the sound parameters could involve setting the parameters to target values: for example, if one of the determined constraints for a sound effect feature was a pitch range, the pitch of that sound effect feature could be set to a value half-way between the end points of the range. Alternatively, the value of the parameters could be randomised subject to the constraints, e.g. by selecting a random pitch value within the range specified by the determined constraints.

In an alternative approach to adjusting the sound effect features, the sound parameters of each sound effect feature could be randomized a plurality of times and then from the plurality of randomized sound parameters, one version that satisfies the determined constraints would be selected.

Once the adjustment of the sound effect features has been completed, in step S105, a second sound effect file comprising the adjusted sound effect features is generated. This second sound effect file represents a customised sound effect for the first animation that was received in step S101 and its sound effect features satisfy the constraints that were determined, based on the first animation, in step S103. This second sound file may be output and associated with the first animation.

The invention claimed is:

1. A computer-implemented method, comprising:

receiving a first sound effect file comprising one or more sound effect features;

receiving an animation representing an action in a video game;

analyzing, using a computer vision algorithm, visual content of the animation to identify at least one animation parameter comprising a material or a dimension of an object in the animation;

determining, based on the identified animation parameter, one or more constraints comprising at least one of a pitch range or a duration limit to be applied to the one or more sound effect features;

adjusting at least one sound parameter of the one or more sound effect features to produce corresponding adjusted sound effect features satisfying the determined constraints; and generating a second sound effect file comprising the adjusted sound effect features.

2. The method of claim 1, wherein the one or more sound effect features comprise a plurality of discrete audio layers of the first sound effect file, and wherein adjusting the one or more sound effect features comprises combining the adjusted audio layers to generate the second sound effect file.

3. The method of claim 1, wherein identifying the at least one animation parameter comprises applying the computer vision algorithm to a sequence of frames within the visual content of the animation.

4. The method of claim 1, wherein the at least one sound parameter comprises at least one of: a temporal position defining a span of time over which a sound effect feature is played; a relative temporal separation between two or more sound effect features; or a volume of the sound effect feature.

5. The method of claim 1, wherein determining the one or more constraints is further based on a movement speed of the object identified during the analysis of the visual content.

6. The method of claim 1, wherein adjusting the at least one sound parameter of the one or more sound effect features comprises randomizing the at least one sound parameter of the one or more sound effect features to a numerical value within the one or more constraints.

7. The method of claim 6, wherein randomizing the at least one sound parameter is performed a plurality of times to generate multiple versions of the sound parameter, and wherein adjusting the one or more sound effect features comprises selecting a version that satisfies the determined pitch range or duration limit.

8. The method of claim 6, wherein the randomized sound parameter comprises a relative temporal separation in time between a first adjusted sound effect feature and a second adjusted sound effect feature.

9. The method of claim 1, wherein identifying the at least one animation parameter comprises extracting metadata associated with a three-dimensional (3D) model file representing the object in the animation.

10. The method of claim 1, wherein determining the one or more constraints comprises determining the pitch range based on the material and determining the duration limit based on the dimension.

11. The method of claim 1, wherein the at least one animation parameter further comprises a movement speed of the object identified using a computer vision pattern recognition algorithm applied to the animation.

12. The method of claim 1, wherein the one or more sound effect features comprise at least a first audio layer and a second audio layer, and wherein a first constraint comprises a pitch of the first audio layer and a second constraint comprises a duration of the second audio layer.

13. The method of claim 1, wherein receiving the animation comprises receiving an animated three-dimensional (3D) model file, and wherein identifying the at least one animation parameter comprises extracting data from the 3D model file defining the dimension of the object and a texture from which the material is inferred.

14. A system comprising:

one or more computers, and one or more storage devices storing instructions that are operable, when executed by the one or more computers to cause the one or more computers to perform operations comprising:

receiving a first sound effect file comprising one or more sound effect features;

receiving an animation representing an action in a video game;

analysing, using a computer vision algorithm, visual content of the animation to identify at least one animation parameter comprising a material or a dimension of an object in the animation;

determining, based on the identified animation parameter, one or more constraints comprising at least one of a pitch range or a duration limit to be applied to the one or more sound effect features;

adjusting at least one sound parameter of the one or more sound effect features to produce corresponding adjusted sound effect features satisfying the determined constraints; and generating a second sound effect file comprising the adjusted sound effect features.

15. The system of claim 14, wherein the one or more sound effect features comprise a plurality of discrete audio layers of the first sound effect file, and wherein adjusting the one or more sound effect features comprises combining the adjusted audio layers to generate the second sound effect file.

16. The system of claim 14, wherein the at least one sound parameter comprises at least one of: a temporal position defining a span of time over which a sound effect feature is played; a relative temporal separation between two or more sound effect features; or a volume of the sound effect feature.

17. The system of claim 14, wherein adjusting the at least one sound parameter of the one or more sound effect features comprises randomizing the at least one sound parameter of the one or more sound effect features to a numerical value within the one or more constraints.

18. The system of claim 17, wherein randomizing the at least one sound parameter is performed a plurality of times to generate multiple versions of the sound parameter, and wherein adjusting the one or more sound effect features comprises selecting a version that satisfies the determined pitch range or duration limit.

19. The system of claim 17, wherein the randomized sound parameter comprises a relative temporal separation in time between a first adjusted sound effect feature and a second adjusted sound effect feature.

20. One or more non-transitory computer storage media encoded with computer program instructions that when executed by one or more computers cause the one or more computers to perform operations comprising:

receiving a first sound effect file comprising one or more sound effect features;

receiving an animation representing an action in a video game;

analysing, using a computer vision algorithm, visual content of the animation to identify at least one animation parameter comprising a material or a dimension of an object in the animation;

determining, based on the identified animation parameter, one or more constraints comprising at least one of a pitch range or a duration limit to be applied to the one or more sound effect features;

adjusting at least one sound parameter of the one or more sound effect features to produce corresponding adjusted sound effect features satisfying the determined constraints; and generating a second sound effect file comprising the adjusted sound effect features.

* * * * *